United States Patent

[11] 3,612,389

| [72] | Inventor | Eugene D. Green<br>La Mesa, Calif. |
|---|---|---|
| [21] | Appl. No. | 800,312 |
| [22] | Filed | Dec. 23, 1968 |
| [23] | | Division of Ser. No. 569,303, Aug. 1, 1966,<br>Pat. No. 3,497,945. |
| [45] | Patented | Oct. 12, 1971 |
| [73] | Assignee | General Dynamics Corporation<br>San Diego, Calif. |

[54] APPARATUS FOR SOLID-STATE WELDING
2 Claims, 6 Drawing Figs.

[52] U.S. Cl. ........................................................ 228/44,
29/494, 29/498, 228/5, 228/49
[51] Int. Cl. ........................................................ B23k 19/00
[50] Field of Search ........................................... 29/474.4,
474.5, 494, 498, 198; 228/44, 49

[56] References Cited
UNITED STATES PATENTS

| 3,110,961 | 11/1963 | Melill et al. .................. | 29/493 X |
| 2,879,587 | 3/1959 | Mushovic et al. .............. | 29/488 |
| 3,025,592 | 3/1962 | Fischer et al. ................. | 29/497.5 X |
| 3,200,491 | 8/1965 | Walker et al. .................. | 29/198 X |
| 3,282,661 | 11/1966 | Kawai et al. ................... | 29/198 X |
| 3,355,078 | 11/1967 | Smith ........................... | 228/44 |
| 3,388,465 | 6/1968 | Johnston ....................... | 228/44 X |
| 3,395,439 | 8/1968 | Palesi et al. ................... | 228/4 X |

*Primary Examiner*—John F. Campbell
*Assistant Examiner*—R. J. Craig
*Attorney*—John R. Duncan, Jr.

ABSTRACT: A vacuum pack encapsulation device for containment of metal members to be joined together by solid-state welding. Positioners are assembled inside the pack in and around the metal members for support thereof during the welding process. Certain of the individual elements of the pack are spaced from one another and spaced from the metal members by deformable spacers. The spacers deform under compression force to permit the pack elements to move toward one another whereby the compression force is transmitted to the metal members to effect welding thereof.

INVENTOR.
EUGENE D. GREEN
BY
ATTORNEY.

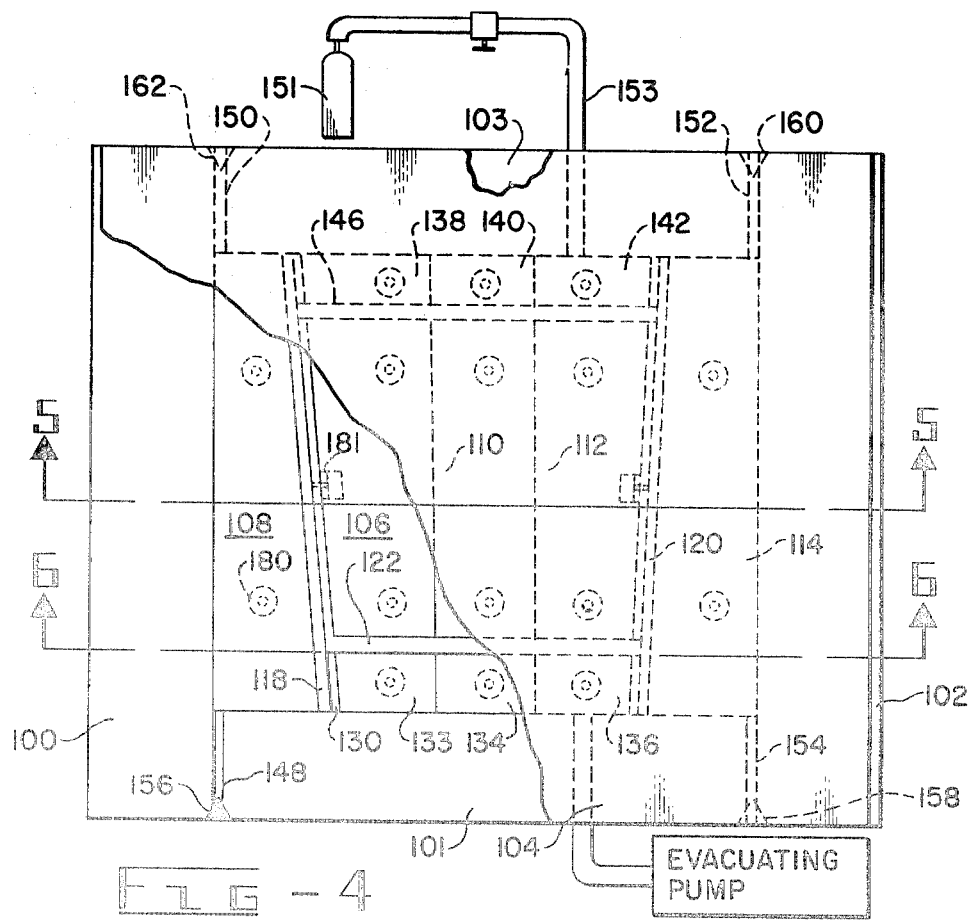
FIG-4
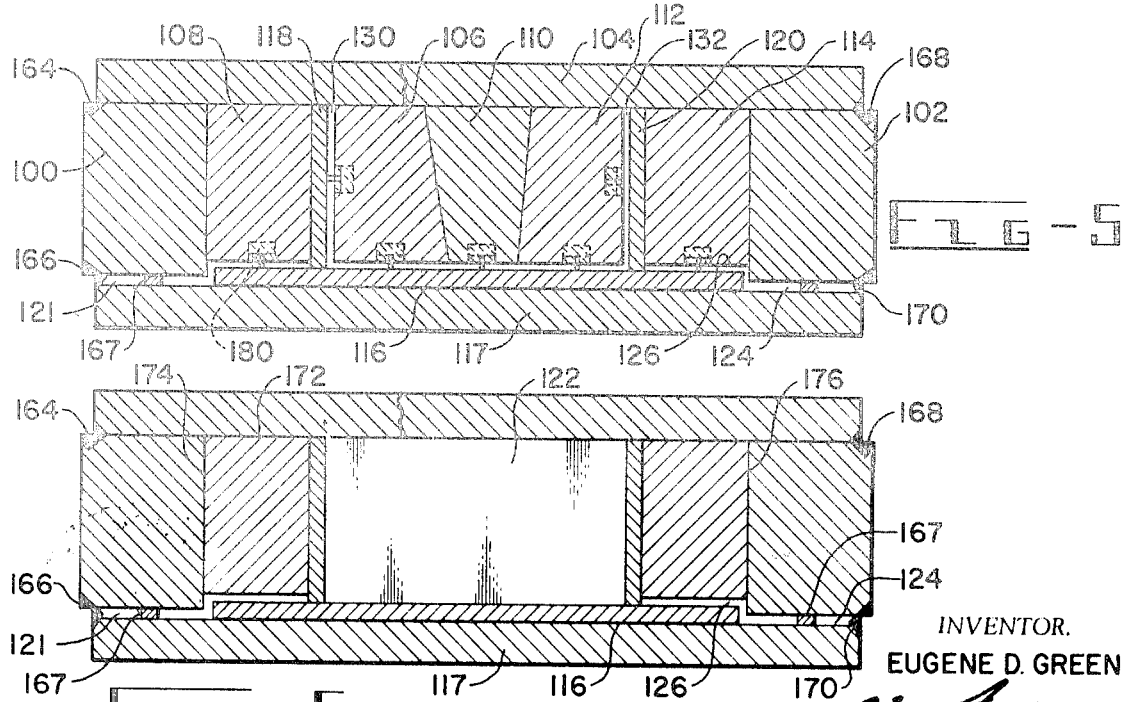
FIG-5
FIG-6
INVENTOR.
EUGENE D. GREEN
BY
ATTORNEY.

APPARATUS FOR SOLID-STATE WELDING

This is a division of application Ser, No. 569,303, filed Aug. 1, 1966, now U.S. Pat. No. 3,497,945.

This invention pertains to a method and apparatus for solid-state welding and more particularly to a method and apparatus for joining or solid-state welding at least a pair of metal members by application of controlled heat and dynamic pressure in an evacuated environment.

The use in industry of higher performance materials such as refractories and super alloys and the use of new structural design concepts has emphasized the need for new and more efficient joining techniques. In general the joining techniques presently used in these environments are pressure welding, diffusion bonding or roll bonding, and fusion welding. Pressure welding is accomplished by the application of heat and extreme pressure and is performed in the normal atmosphere. This technique has limitations such as, for example, oxidizing problems between the joints and the necessity for extreme pressures. Diffusion bonding is accomplished by positioning metal members to be joined in an abutting position in an encapsulating metal structure. The metal structure is then heated and rolled. This technique called, "Roll Diffusion Bonding" requires high pressures to be generated by heavy rolling mills, which rolling mills collapse the entire assembly against the members being joined. It is thereafter extremely difficult to separate the encapsulating metal from the joined members. Usually it is necessary to cut away, leach or otherwise removed the metal piece by piece from the members that are joined. This diffusion bonding technique is an expensive, complicated, time-consuming method of joining metal members and does not lend itself to joining transverse members in the same encapsulation. Fusion welding is accomplished by melting the joined members to the point that they adhere. This involves changing the grain structure of the metal adjacent the junction of the members which seriously effects the strength of the joint.

All of the aforesaid processes are either extremely expensive to use in joining parts, do not provide a satisfactory joint, or provides a joint that is considerably weaker than the adjacent metal.

Therefore it is an object of this invention to provide a new and improved method and apparatus for joining at least a pair of metal members.

It is another object of this invention to provide a new and improved method and apparatus for joining metal members in a solid-state weld which can be accomplished without the use of heavy rolling mills or the like.

It is another object of this invention to provide a new and improved solid-state welding, process and apparatus that utilizes a reusable encapsulating steel pack assembly.

It is another object of this invention to provide a new and improved method and apparatus for joining metal members which joined members thereafter require little or no machining.

It is another object of this invention to provide a new and improved method and apparatus for solid-state welding of members.

It is another object of this invention to provide a new and improved method and apparatus for joining metal members in which the surface finish of the joined members is substantially the same as before the joining.

It is another object of this invention to provide a new and improved method and apparatus for welding members by compression and heat techniques in which the joined article is distortion free.

It is another object of this invention to provide a new and improved method and apparatus for joining metal members in an encapsulating assembly that is particularly adapted for forming parts having large and heavy joint areas.

It is another object of this invention to provide a new and improved solid-state welding process and apparatus that is capable of joining vertically arranged members and transverse members in the same encapsulation.

It is another object of this invention to provide a new and improved method and apparatus for joining metal members in members in an encapsulating assembly wherein the members are in a prestressed condition.

It is another object of this invention to provide a new and improved method and apparatus for joining metal members which is inexpensive, simple in application, and can be accomplished through the use of relatively inexpensive equipments.

It is another object of this invention to provide a new and improved method and apparatus for joining members together through compression in which the compression is controlled, balanced and confined to the joined areas only.

It is another object of this invention to provide a new and improved method and apparatus for welding parts together in which the end article at the point of weld has mechanical and metallurgical joint properties that are essentially the same as the base material.

My invention accomplishes the foregoing objects and advantages by placing at least a pair of metal members in abutting position in a metal encapsulation assembly. The encapsulation assembly may have an integral metal side enclosure with a base member and a top member. The dimensions of the side members are such that when the members to be joined are placed in joining position between the top cover and the baseplate, a space exists between the top cover and the top of the side enclosure and the baseplate and the lower edge of the side enclosure. Spacers are placed in these spaces for maintaining the desired space relationship between the sides and the top cover and baseplate while the top cover and the baseplate abut the upper and lower surfaces of the members to be joined. Positioning members are inserted into this encapsulating member to provide lateral support and positioning of the members to be joined. The space between the side enclosure and the top cover plate and the lower base member is then sealed by welding or the like to maintain the aforesaid spaced relationship and also to seal the encapsulating assembly. The space above and below the positioning members is maintained in correct relationship by other spacer means.

Prior to inserting the metal members to be joined into the encapsulating assembly, the particular area of the metal members to be joined are cleaned. This cleaning process is accomplished by electropolishing the joined areas and then etching the surfaces to remove the film created by the electropolishing. The etched joints are then rinsed at least twice and retained in the rinse until time for assembly in the encapsulating assembly. The encapsulating assembly is equipped with means for evacuating the assembly when sealed and also for providing an insert gas under positive pressure to the assembly. During the assembly of the members to be joined in the encapsulating assembly, the inert gas floods the area reducing the possibility of oxidation of the cleaned joint areas. After the encapsulating assembly has been sealed by welding or the like, the encapsulating assembly is evacuated by a vacuum pump and at the same time is repetitively flushed by the inert gas to remove all undesirable gases, moisture, oxygen and the like from the sealed assembly.

Following assembly and sealing, the encapsulating assembly is then inserted into an oven or the like and heated to a temperature substantially approaching but not exceeding the transition temperature of the metal to be joined. The encapsulation assembly is then soaked in this high temperature for a period of time and removed and compressed in a press or the like, which presses the top and bottom plates together against the side members. This compresses the metal plates to be joined only at the point of their joint areas with a pressure that is sufficient to make the metal flow. This creates a smooth fillet that is shaped by the restriction of the positioning members.

This process of heat and pressure does not change the grain structure of the base material. Rather the joint actually grows together because it is accomplished below that range or temperature of the metal being joined at which the metal fracture characteristics change from primarily fibrous (shear) to primarily crystalline (cleavage). This range of temperature is hereinafter called the transition temperature. This use of heat and the application of dynamic pressures sufficient to induce plastic deformation of the metal member joints at the temperature involved, permits a joining of the parts that provides a high strength structural joint. Further, there is no interface or enlarged grain structure in the weld and the joint has a very smooth fillet surface with a complete joining of the metal. Because of the raised temperature and that the dynamic force is applied only to the areas to be joined, the force required to achieve the pressure necessary to accomplish the weld is relatively low and can be accomplished without resorting to rolling mills or the like.

The usual problem of having the joined parts fused within the encapsulating structure is avoided by imparting a parting agent on surfaces of the encapsulating assembly prior to assembly. This is accomplished by heat treating the encapsulating assembly to a temperature that gives a substantially pale yellow heat discolor to the encapsulating assembly structure. The discoloring represents a very thin oxide coating that reduces or eliminates the adherence between the encapsulating structure and the metal parts that are joined. However, the total oxides in the coating within the encapsulation is not sufficient to affect the quality of the joint.

Other objects and advantages of this invention will become more apparent in considering the following more detailed description of my invention in which like reference numerals designate like parts throughout the drawings and in which:

FIG. 4 is a top plan view partly in section and in phantom of a modified form of the encapsulation assembly for joining transversely positioned metal parts.

FIG. 5 is a cross-sectional view taken along lines 5—5 of FIG. 4.

FIG. 6 is a cross-sectional view taken along 6—6 of FIG. 4.

Figure 1:
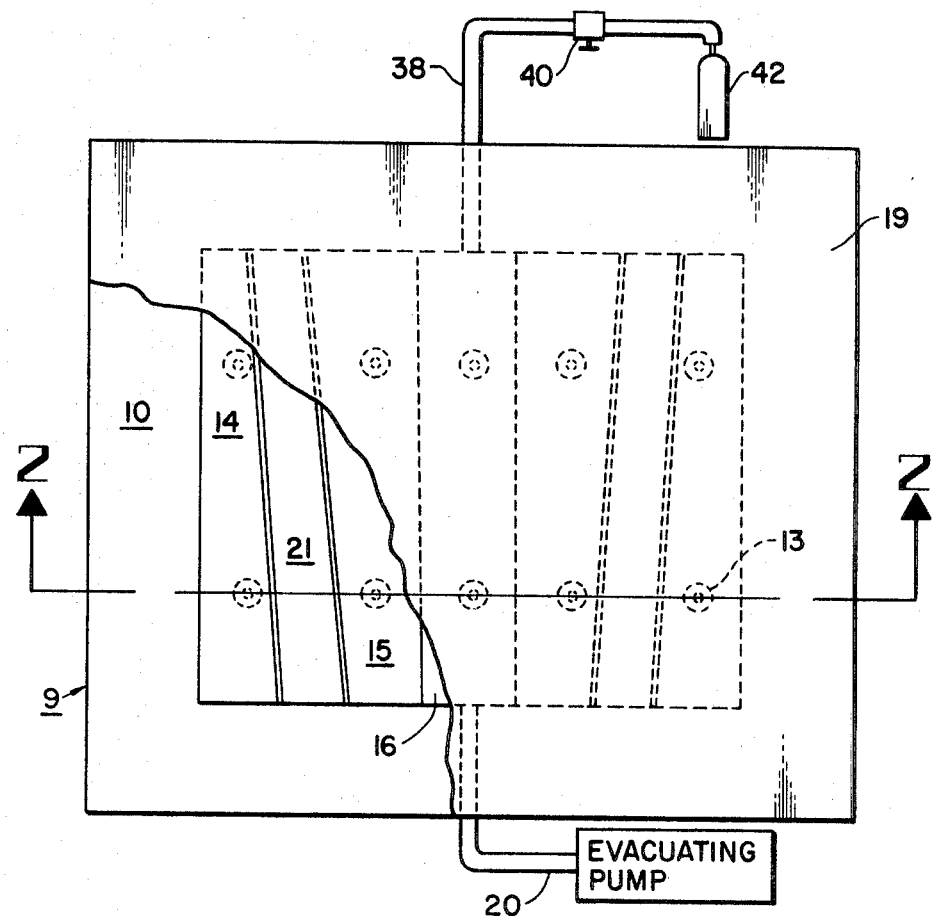
FIG. 1 is a top plan, view partly in section and in phantom, of the encapsulation assembly and the metal parts to be joined by my invention.
Figure 2:
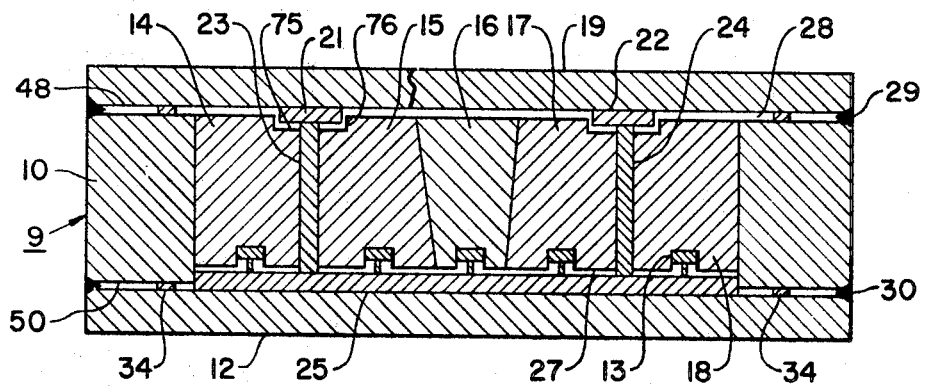
FIG. 2 is a cross-sectional view taken along line 2—2 of FIG. 1.
Figure 3:
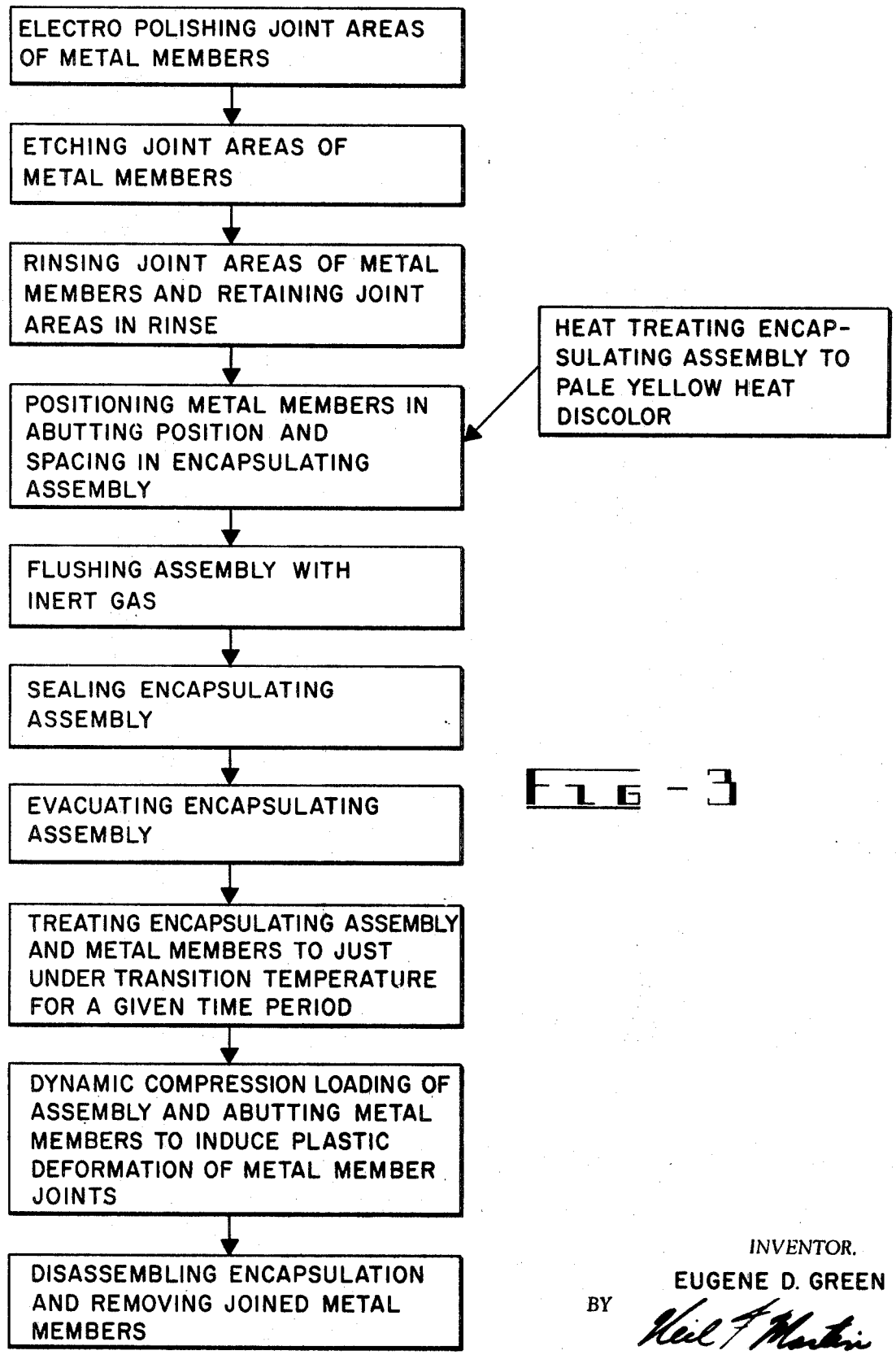
FIG. 3 is a block flow diagram of the steps of the method of my invention.

Referring now to FIG. 1, encapsulating assembly 9 has an integral side enclosure 10 and a top plate 19 and baseplate 12. Positioned in the encapsulating assembly to be welded or joined is a skin or flat plate member 25 that rests on the upper surface of the baseplate 12. Longitudinal vertical members 23 and 24 rest on the upper surface of the skin 25, and mounted on the upper edge of the vertical members 23 and 24 are longitudinal plates 21 and 22. The relative positions of the vertical members 23 and 24 are maintained by positioning members 14, 15, 16, 17 and 18. As can be seen, positioning member 16 has a wedge shape that facilitates forcing the positioning member 16 down the inclined adjacent surfaces of positioning members 15 and 17. This causes members 15 and 17 to move outwardly against the vertical plates 23 and 24 and the outer positioning members 14 and 18. The wedge-shaped member 16 assures a correct positioning of the metal plates in the assembly and is also able to move vertically to facilitate disassembly of the structure after the welding operation has been completed. As can be seen the composite height of the skin member 25, vertical members 23 and 24 and plate 21 is greater then the height of the side enclosure 10. Accordingly, a space exists between the top edge of the side enclosure and the top plate and bottom edge of the side enclosure and the baseplate. The thickness of the spaces 28 and 50 between the top plate 19 and the bottom plate 12 and the side enclosure 10, is set by the thickness of the easily crushed spacers 34.

The height and spacing of the positioning members relative to the top and bottom plate of the encapsulating assembly and the metal members within the assembly to be joined is set by a plurality of spacer pin members 13. The spacer members 13 fit into recesses in the lower surfaces of the positioning members, as shown. In the particular embodiment of my invention disclosed herein, the encapsulation assembly may be made of steel or other suitable material. The metal members to be joined can be made of titanium or of any other suitable metal. It also may be recognized that the positioning members can be of any size or shape that is necessary to position a particular structure to be formed and that will facilitate removal of the joined members from the assembly after being formed.

After the metal members to be joined are correctly positioned in the encapsulating assembly by positioning members 14, 15, 16, 17 and 18, the opening between the side members and the top plate and the baseplate members is sealed. This sealing may be accomplished by any suitable means. A way of sealing the opening that I have found to be particularly advantageous, is by welded fillets 29 and 30. The welded fillets create a longitudinal joint that not only is strong and can take heat, but that can be squeezed and still maintain the seal.

A conduit 38 is connected at one side of the assembly to a container of inert gas 42. The conduit selectively carries the gas to the assembly volume, as controlled by valve 40. The inert gas is supplied under a positive pressure to the entire assembly during the assembly to protect the surfaces of the metallic members to be joined from oxidation or the like. After sealing, the inner volume of the encapsulating assembly is evacuated through line 20 by an evacuating pump. During evacuation, inert gas is used to flush the inner volume of the encapsulating assembly and to chase the unwanted gases and moisture and the like from the volume.

Prior to assembly, the parts of the encapsulating assembly are heated to a point in which they are heat discolored to a pale yellow. This is the lowest color in the tempering color spectrum and reflects a thin oxide coating on the surfaces of the metal parts. This oxide coating does not adhere to the metal members joined during the solid-state welding process and thus the coating facilitates economical disassembly of the encapsulated assembly. Accordingly, the encapsulation structure is reuseable in continued repetitive production.

The problem of contamination on the surfaces of the areas to be joined has been found to be a problem. It has therefore been determined to be advantageous to prepare the joined surfaces for efficient solid-state welding. This is accomplished in my novel method by eliminating the contaminants on the surfaces to be joined and maintaining them in a contaminate free condition thereafter until the members are joined. This is done by electropolishing and titanium etching. Electropolishing is normally used for enhancing the surface finish of a metal as a final finish or base for subsequent coatings. In preparing the joint surfaces for welding, the products of the anodic metal dissolution react with the electrolyte to remove metal and form a film at the metal surface. Thus in this step the electropolishing process removes and or dissolves into the film all surface oxides and gases present before electropolishing. Two types of combined films are created on the surfaces by electropolishing. One is a viscous film that is nearly saturated with the dissolution product and the other film comprises anodical discharged gases. This viscous film is particularly resistant to further oxidation or corrosion and forms a barrier over the now relatively uncontaminated metal, which is not allowed to be subsequently exposed to contaminating conditions in this process. When the parts to be joined are, for example titanium, all detailed parts are then cleaned, prior to assembly in an etch solution, which for titanium consists of 25 percent to 30 percent nitric acid ($HN_3$) and 1 percent to 3percent hydrofluoric acid (HF). This removes contaminating foreign matter from all surface of the parts and also removes the electropolished film at the joint areas, leaving a relatively oxide and gas free joining surface. The etched parts are then double rinsed in the de-ionized water and remain submerged in the second rinse until required for final assembly. This works as a protective coating from the oxidation and contamination. When the parts are removed from the de-ionized water for final assembly, they are then immediately placed in the encapsulated container which is flooded with inert gas during the assembly and sealing operations.

The encapsulation is then evacuated while being back flushed approximately three or more times with the inert gas before the final vacuum is drawn. This dilutes the remaining air content and minimizes the necessity for higher vacuum. The tubes 20 and 38 are then sealed by hot forging while the assembly is under vacuum. This removes the excess evacuation tubing outside of the forged sealed area. The entire solid-state weld pack assembly is then moved into a furnace with accurate temperature controls set close to, but not exceeding a temperature that is just below transition temperature of the material to be joined. After being maintained in this heat for a given period of time, the assembly is then removed and pressure is applied against the top plate and the lower baseplate by a press or the like. This moves the plates together, collapsing the spacers 34, the pin spacers 13 and the weld seal in the spacing between the top and bottom plates and the side members. Thus a confining and concentrating dynamic pressure is applied to the junction areas only, which force is sufficient to induce plastic deformation. The assembly is then removed and allowed to air cool. The vacuum seals are broken and the assembly is disassembled removing the joined part.

The steps in operation of the invention for joining titanium members are as follows. The joined areas of the metal members are electrochemically cleaned to remove the oxide and contaminants from the titanium joint areas immediately prior to assembly. Electropolishing is then used for this purpose and during this polishing the products of the anodic metal dissolution react with the electrolyte to remove metal and form a film at the metal surface. This removes or dissolves into the film all surface oxide and gases present before electropolishing. The areas are then cleaned prior to final assembly in an etch solution. This removes contaminating foreign matter, such as the electropolishing developed film, from the surfaces leaving a relatively oxide and gas-free joining surface. The cleaned parts are then double rinsed in a de-ionized solution and kept submerged in the second rinse until the time for final assembly. This protects the surfaces to be joined from further oxidation and contamination. When the parts are removed from the de-ionized water for further assembly, they are immediately placed in the encapsulating assembly which is flooded with inert gas during the assembly and sealing operations. Prior to inserting the parts in the encapsulating assembly, the parts of the assembly are heat treated to obtain the previously described oxide coating. The parts are then correctly positioned in the encapsulating assembly and the encapsulating assembly is sealed by a sealing fillet weld. It should be recognized that the weld contracts, and thus exerts a force to bring the top plate and bottom plate closer to the side enclosure. This maintains a prestressed condition on the joint faces, that holds the parts to be welded together during the remainder of the assembly operation and thereafter. While the vacuum sealing weld is being made, a positive pressure of inert gas, such as argon, or the like, is maintained in the assembly through tube 38. This eliminates the possibility that contaminating oxidation will affect the joints to be welded. After sealing, a pressure and vacuum test is completed on the assembly. The assembly is then evacuated by evacuating pump through line 20. During this evacuation cycle the pack is back flushed at least three times with inert gas before final vacuum pump down. This dilutes the remaining gas content and minimizes the necessity for a high vacuum. The tubes 20 and 38 are sealed by hot forging while the assembly is under vacuum.

The complete solid-state weld encapsulating assembly is placed into a furnace and heated to a temperature that is close to but does not reach the beta transus temperature of the titanium alloy or the transition temperature of the metal that is being solid-state welded. The temperature control can be maintained by taking a reading of a thermocouple placed in the side members of the assembly and which thermocouple is independent of the furnace controls. When the assembly has reached uniform temperature, it is allowed to soak at this temperature for a period of time. The assembly is then removed from the furnace and placed in a press. The press applies sufficient dynamic pressure to compress spacers 34, the pin spacers 13 and weld seals 29 and 30 close the gaps 48 and 50 and thereby apply a concentrated dynamic pressure sufficient to induce plastic deformation in the member junction areas only.

Because the dynamic pressure and compression is controlled and confined to the weld joint areas only and is not applied to reduce the entire pack to a solid mass, the assembly can be disassembled with relative ease. Further this results in a more uniform and undistorted weld that has excellent surface finishes. The upper edges of the positioning members 75 and 76, for example, shape the particular fillet at the point of the weld.

Referring to the modification of my invention in FIGS. 4, 5 and 6, there is shown an encapsulation assembly for solid-state welding of vertically and transversely positioned parts. In this embodiment, the side enclosure comprises separate side members 100, 101, 102 and 103 with a top plate 104 and a baseplate 117. Mounted on baseplate 117 is a skin or plate 116 to which vertical plates 118, 120 122 and 146 are to be joined. Also plates 122 and 146 are to be welded by a transverse solid-state weld to the sides of vertical plates 118 and 120 as well as to plate 116. These two vertical and transverse welds are accomplished in two separate dynamic compression steps as will be more clear hereinafter.

In the assembly, positioning members 108 and 114 abut against side members 100 and 102 and against vertical plates 118 and 120. The ends of side members 100 and 102 are spaced from side members 101 and 103 by spacers 148, 150, 152 and 154. The inclined sides of center longitudinal wedge member 110 rest against members 106 and 112 and tends to move them outwardly. The outer edges of positioning members 106, 138, 133, 112, 136 and 142 are spaced from vertical members 118 and 120 by pin spacer members 181. These spacer members 181 maintain the correct spacing 130 and 132 therebetween as is necessary for later welding. There are also spaces 148, 150, 152 and 154 between the side members that correspond to the width of the spaces 130 and 132.

When assembled the ends of transverse plates 122 and 146 abut against the vertical members 118 and 120. The volume between transverse plates 122 and 146 and side members 101 and 103 is occupied by positioning members 133, 134, 136, 138, 140 and 142, which positioning members have substantially the same shape and have the same function as positioning members 106, 110 and 112. All of the positioning members are supported by pin spacers 180.

When the encapsulation assembly and members to be joined are assembled, the openings are welded closed by weldments 156, 158, 160, 162, 164, 166, 168 and 170. These weldments seal the encapsulation and hold the spacing set by, for example, crushable spacers 167. After sealing, then the encapsulation assembly is evacuated by the evacuating pump and the volume of the sealed assembly is flushed by argon gas from container 151 through line 153 in the manner previously described.

The steps for forming the transverse welds follow the same method steps as previously described except after heating to the transition temperature, the sides 100 and 102 are moved by dynamic force inwardly closing gaps 130 and 132 and making the transverse solid-state welds first. The advantage of using fillet welds 164, 166, 168 and 170 for sealing is that in stress situations, such as the shear loads applied in the inward movement of sides 100 and 102, these welds will normally maintain their seal.

After transverse plates 122 and 146 are joined to vertical members 118 and 120, then dynamic force is applied by a press or the like that moves the top plate 104 and the bottom plate 117 toward each other and against side members 100, 101, 102 and 103, thereby closing gaps 121, 124 and 126. This joins the lower surfaces of vertical members 118 and 120 and transverse plates 122 and 146 to skin 116, which completes joining of the parts. The last step can usually be accomplished without having to reseal any of the openings or returning the assembly to the furnace. However, of course, these latter two steps can be resorted to if necessary.

While the embodiment and method of the present invention is being described in detail, it is to be understood that modifications are to be contemplated which would be apparent to persons skilled in the art without departing from the spirit of the invention or the scope of the appended claims.

1. A vacuum pack solid-state welding apparatus for solid-state welding at least a pair of metal members comprising, at least a pair of metal members for being joined together, a metal encapsulation means having sides and a top and a baseplate and internal positioners for encapsulating said metal members in an abutting position, said encapsulation means being preconditioned by heat treating to a substantially pale yellow heat discolor, means for spacing said top and baseplate a given distance from said sides and maintaining said top and baseplate in direct contact with said encapsulated abutted metal members, spacer means for spacing said internal positioners at spaced distances between said encapsulating means and said metal members, filler means for sealing the space between said top and said sides and said baseplate and said sides of said encapsulation means, means for flushing said encapsulation means and said metal members with an inert gas, and means for evacuating said sealed encapsulation means.

2. A vacuum pack solid-state welding apparatus as defined claim 1 in which, said surfaces of said metal members to be joined have been cleansed by electropolishing and etching.